UNITED STATES PATENT OFFICE.

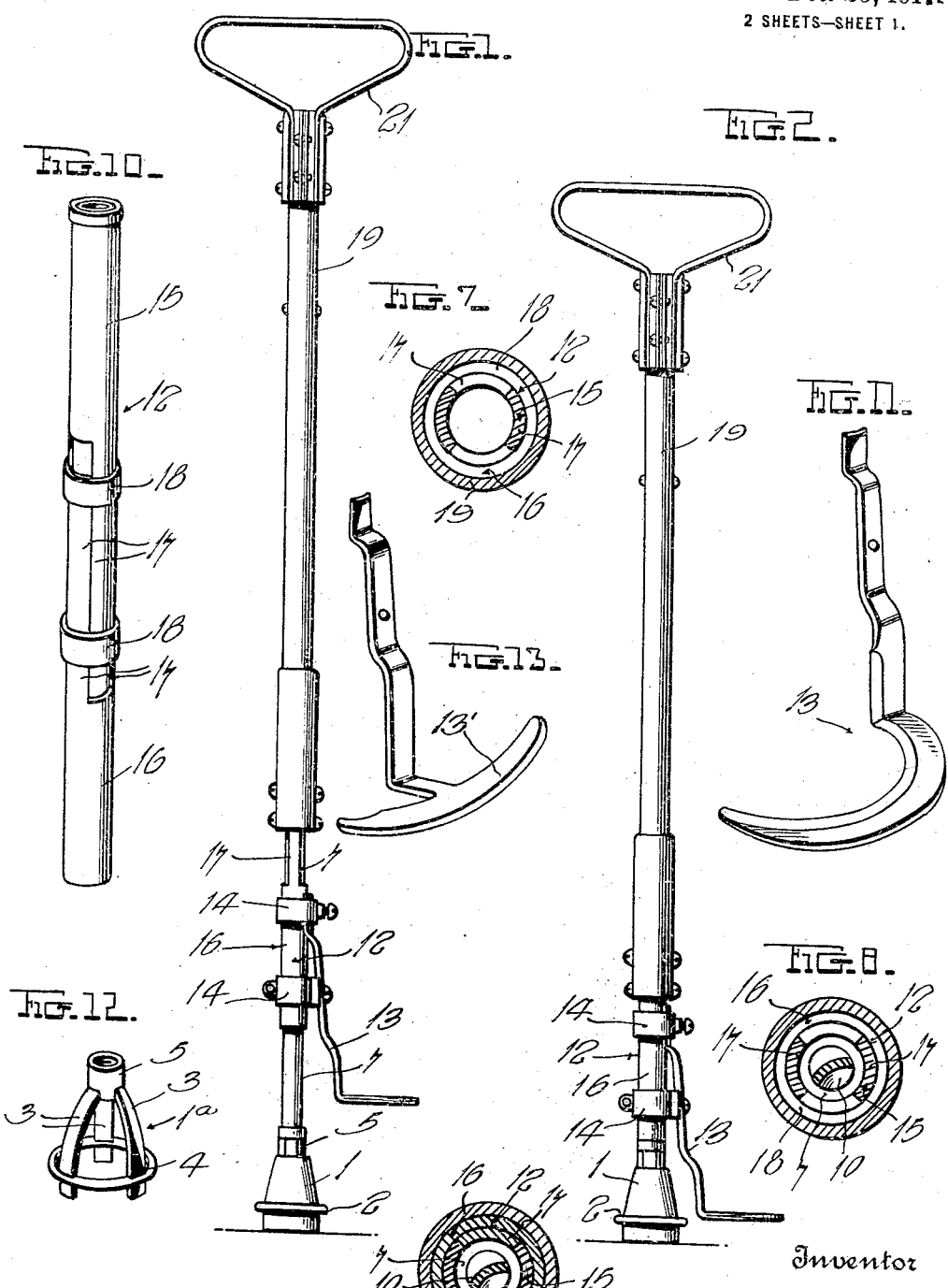

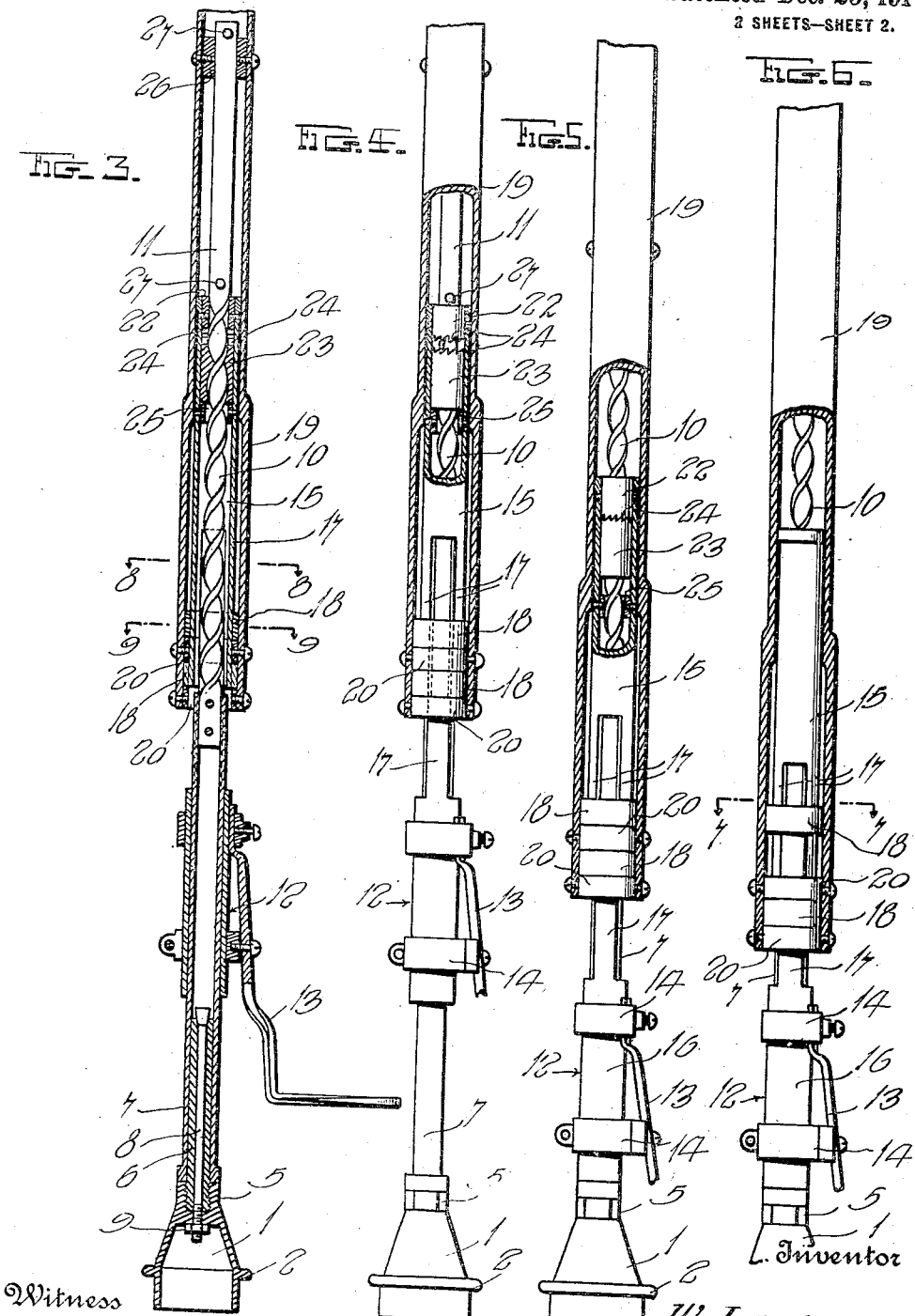

WILLARD LARSON, OF PRESTON, IDAHO.

BEET THINNER AND WEEDER.

1,251,059.  Specification of Letters Patent.  Patented Dec. 25, 1917.

Application filed May 14, 1917. Serial No. 168,469.

*To all whom it may concern:*

Be it known that I, WILLARD LARSON, a citizen of the United States, residing at Preston, in the county of Franklin and State of Idaho, have invented certain new and useful Improvements in Beet Thinners and Weeders; and I do declare the following to be a full, clear, and exact description of the invention, such as will enable others skilled in the art to which it appertains to make and use the same.

My invention has for its principal object to provide a simply constructed and inexpensive, yet a highly efficient device for cutting weeds and other vegetation around selected plants, the device being intended primarily for thinning and weeding beets, although it may well be used for other purposes.

In carrying out the above object, a telescopic staff is employed having a foot at its lower end and a hand grip at its upper end, one section of said staff carrying a sickle which is actuated by depression of the hand grip, a further object of the invention being to provide simple means for simultaneously moving the sickle downwardly while rotating it and for further rotating said sickle after it has traveled downwardly to the limit.

Yet another object is to provide a simple and efficient foot for the device, said foot being adjustable to permit the sickle to descend a greater or less amount, according to the height at which the weeds and the like are to be cut.

With the foregoing general objects in view, the invention resides in the novel features of construction and unique combinations of parts to be hereinafter fully described and claimed, the descriptive matter being supplemented by the accompanying drawings which constitute a part of this application and in which:

Figure 1 is a side elevation of the tool in readiness for operation;

Fig. 2 is a similar view after the operating handle has been depressed;

Fig. 3 is an enlarged vertical section of Fig. 1;

Fig. 4 is a view similar to Fig. 3 with parts in elevation to show more particularly the action of the clutch when the handle is raised;

Fig. 5 is a duplicate of Fig. 4 with the exception that the handle has been depressed to bring the clutch into operation for actuating the sickle;

Fig. 6 is a view similar to Fig. 5, showing the manner in which the upper section of the operating sleeve moves downwardly upon the lower section of said sleeve after the latter has reached the limit of its movement;

Fig. 7 is a horizontal section on the plane of the line 7—7 of Fig. 6;

Figs. 8 and 9 are similar horizontal sections on the planes of the lines 8—8 and 9—9 respectively of Fig. 3;

Fig. 10 is a perspective view of the operating sleeve;

Fig. 11 is a similar view of the sickle;

Fig. 12 is a perspective view of a modified form of foot;

Fig. 13 is a perspective view illustrating a different form of sickle.

In the drawings above briefly described, the numerals 1 and 1ª designate two forms of supporting feet which may be used with the device, the foot 1 being in the form of a hollow cone having an external rib 2 whereas the foot 1ª is of openwork construction and includes a plurality of arms 3 diverging downwardly and joined near their lower ends to a horizontal ring 4. The upper end of each foot is provided with a ferrule 5 threaded on the lower end of an expansion member 6 which is slidable various distances into the lower end of a vertical operating shaft 7, said expansion member having a bolt 8 and a nut 9 which serve not only to expand said member, but to lock the foot 1—1ª in operative position.

The shaft 7 is provided with a steeply pitched worm 10 secured rigidly to the lower tubular section of said shaft, said worm being preferably formed by twisting a flat metal bar as shown, the upper end 11 of said bar being straight and free from projections.

A sleeve 12 surrounds the shaft 7 and carries one or more sickles 13 secured thereto by any appropriate clamps 14, said sleeve being constructed of upper and lower slidably connected sections 15 and 16, the lowermost of which is provided with the sickle 13. Although any suitable sliding connection could be employed between the two sections 15 and 16, the inner ends thereof are preferably formed with furcations 17, those of one being slidable between those of the other, and the free ends of all of said furcations having collars 18. The collar of each section surrounds the other section as shown most clearly in Figs. 4 and 10 and said collar of the upper section is swiveled in the lower end of a tubular handle 19 by means of thrust bearings 20 which are secured in the lower end of said handle and positioned above and below said collar. The upper end of the handle 19 is provided with a suitable hand grip 21 for forcing said handle downwardly to move the sleeve 12 downwardly along the shaft 7, the upper section 15 of said sleeve having means engaging the worm 10 so that the sleeve is rotated to operate the sickle as it is forced downwardly.

The means last referred to is shown in the form of a clutch constructed of upper and lower sections 22 and 23 positioned in the upper end of the sleeve section 15 and having coacting teeth 24 on their inner ends, the lower section 23 being constructed to follow the worm 10 and to turn in the sleeve section 15, whereas said worm passes rotatably through the upper clutch section 22, the latter being rigidly secured in the sleeve. An internal shoulder 25 is provided in the sleeve section 15 for limiting the downward movement of the clutch section 23, this movement being sufficient, however, to normally disengage the teeth 24 so that as the handle is raised, section 23 may spin idly as it travels upwardly along the worm. The moment the upper section 22 is forced downwardly, however, by depression of the handle 19, the two sets of teeth 24 interengage so that as the section 23 is rotated by the worm 10, it will similarly rotate the section 22, which movement will be imparted to the entire sleeve 12 to operate the sickle 13.

Preferably employed in connection with the features of construction above described, is a guide 26 secured in the handle 19 and receiving the straight end 11 of the worm 10, said end having stops 27 to strike said guide to limit the reciprocatory movement of the handle 19. Although this construction will in most cases be employed, it is to be understood that other suitable arrangements of parts could be utilized for obtaining the same result, and I do not therefore wish to limit my invention to such details.

In operation, assuming that the handle is raised as shown in Fig. 4, the sleeve 12 will then be extended and the lower section 16 thereof will be suspended from the handle 19 since the collar 18 of said section then abuts the uppermost thrust bearing 20. The two-part clutch now stands at the upper end of the worm 10. With the several parts in these positions, the foot of the device is placed over the selected plant and the handle is depressed, the result being that the two parts of the clutch immediately engage so that as the sleeve 12 is moved downwardly, said sleeve is rotated, thus swinging the sickle 13 around a circular path and simultaneously lowering said sickle. By the time the sleeve section 16 reaches the limit of its downward movement, which limit is controlled by the position of the expansion member 6 in the shaft 7, the clutch has not moved to the lower end of the worm 10. The result is that further depression of the handle will slide the section 15 farther downward while said clutch and worm continue to rotate both sections. The sickle is thus caused to make several revolutions after it has reached the limit of its downward movement, thereby insuring that the weeds and other vegetation in the path of said sickle shall be effectively destroyed. The height at which the sickle 13 operates, may be readily controlled by sliding the expansion member 6 a greater or less amount into the lower end of the shaft 7.

Although the several features of the invention have been specifically described, it will be obvious that the same consists briefly of a telescopic staff having a hand grip at one end and a vertically adjustable foot at the other, one section of said staff carrying the sickle which is automatically operated by depression of said hand grip. These features are the essentials of the device and since probably the best results are obtained by the construction shown and described, the same constitutes the preferred form of the implement. It is to be understood, however, that within the scope of the invention as claimed, numerous minor changes may be made. For instance, the sickle may be varied in shape and its sharpened portion may well be on its outer edge as shown at 13' in Fig. 13.

I claim:

1. A weeding tool comprising a cutting knife spaced normally above the ground, means for simultaneously lowering and rotating said knife and further rotating the same after lowering thereof, and a supporting foot for said means adapted to rest on the ground.

2. A tool of the class described comprising a foot, a non-rotating shaft rising rigidly therefrom and having a steeply pitched worm, a sleeve surrounding said shaft slidably and having means engaging said worm, a handle swiveled to said sleeve for reciprocating the same, and a tool carried by said sleeve.

3. A tool of the class described comprising a foot, a non-rotating shaft rising rigidly therefrom and having a steeply pitched worm, a sleeve surrounding said shaft slidably and having means engaging said worm, a tubular handle surrounding said sleeve and swiveled thereto for reciprocating the same, and a tool carried by said sleeve.

4. A tool of the class described comprising a foot, a shaft rising therefrom and having a steeply pitched worm, a sleeve slidable and rotatable on said shaft and carrying a tool, sleeve operating means slidably connected to said sleeve and engaging said worm, and a handle swiveled to said operating means.

5. A tool of the class described comprising a foot, a shaft rising rigidly therefrom and having a steeply pitched worm, a sleeve surrounding said shaft slidably and formed of upper and lower slidably connected sections, said upper section having means engaging said worm, a tool carried by said lower section, and an operating handle swiveled to said upper section.

6. A tool of the class described comprising a foot, a shaft rising rigidly therefrom and having a steeply pitched worm, a sleeve surrounding said shaft slidably and formed of upper and lower sections having furcations at their inner ends, the furcations of one being received slidably between those of the other, collars secured to the furcations of said sections, an operating handle having thrust bearings disposed above and below the collar of the upper section, said upper section having means engaging said worm, and a tool secured to the lower section.

7. A tool of the class described comprising a foot, a shaft rising rigidly therefrom and having a steeply pitched worm, a sleeve surrounding said shaft slidably and formed of upper and lower sections having furcations at their inner ends, the furcations of one being received slidably between those of the other, collars secured to the furcations of said sections, a tubular operating handle surrounding said upper section and having thrust bearings above and below the collar thereof, and a tool carried by the lower section.

8. A tool of the class described comprising a foot, a shaft rising therefrom and having a steeply pitched worm, a sleeve surrounding said worm and carrying a tool, a clutch in said sleeve formed of upper and lower normally separated sections, the lower section of said clutch being mounted on said worm to follow the same, and the upper section being secured to the sleeve, said lower section being slidable and rotatable in the sleeve and the latter having means for limiting the downward movement thereof, and an operating handle swiveled to said sleeve.

9. A tool of the class described comprising a telescopic staff having a hand grip at its upper end, a sickle secured to one section of said staff, means for rotating said section when said hand grip is depressed, an expansion member slidable into the lower end of the lower section of the staff, and a foot carried by said expansion member.

10. A tool of the class described comprising a shaft having a coarsely pitched worm, a sleeve slidable and rotatable on said shaft, a tool carried by said sleeve, means for reciprocating said sleeve, and means carried by said sleeve and engaging the worm for imparting rotary movement to the former as it is reciprocated.

In testimony whereof I have hereunto set my hand in the presence of two subscribing witnesses.

WILLARD LARSON.

Witnesses:
RABEN A. HANSEN,
HERMAN C. NUFFER.